US006786803B2

(12) United States Patent
Crawforth et al.

(10) Patent No.: US 6,786,803 B2
(45) Date of Patent: Sep. 7, 2004

(54) ONBOARD MULTIPHASE ELECTRONIC LAPPING GUIDE DESIGN FOR MR HEADS

(75) Inventors: Linden J. Crawforth, San Jose, CA (US); Douglas J. Werner, Fremont, CA (US); Benjamin L. Wang, San Jose, CA (US); Timothy J. Minvielle, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/299,219

(22) Filed: Nov. 19, 2002

(65) Prior Publication Data

US 2004/0097173 A1 May 20, 2004

(51) Int. Cl.[7] .............................................. B24B 49/00
(52) U.S. Cl. .................................. 451/41; 451/5; 451/9
(58) Field of Search ............................. 451/1, 5, 8–11, 451/28, 41; 29/603.01, 603.12, 603.15, 603.16, 593; 360/72, 103, 104

(56) References Cited

U.S. PATENT DOCUMENTS

| | | | |
|---|---|---|---|
| 4,841,625 A | 6/1989 | Valstyn | 29/603 |
| 5,023,991 A | 6/1991 | Smith | 29/603 |
| 5,210,667 A | 5/1993 | Zammit | 360/113 |
| 5,913,550 A | 6/1999 | Watanuki | 29/603.1 |
| 6,027,397 A | 2/2000 | Church et al. | 451/1 |
| 6,132,290 A | 10/2000 | Sugiyama et al. | 451/10 |
| 6,193,584 B1 * | 2/2001 | Rudy et al. | 451/5 |
| 6,196,897 B1 | 3/2001 | Suto et al. | 451/8 |
| 6,419,552 B2 * | 7/2002 | Katoh et al. | 451/9 |
| 6,568,992 B1 * | 5/2003 | Angelo et al. | 451/8 |
| 6,609,948 B1 * | 8/2003 | Fontana et al. | 451/5 |

* cited by examiner

Primary Examiner—Joseph J. Hail, III
Assistant Examiner—David B. Thomas
(74) Attorney, Agent, or Firm—Walter W. Duft

(57) ABSTRACT

An onboard electronic lapping guide for lapping a magneto-resistive head having a magneto-resistive sensor element disposed for electrical communication with a pair of sensor electrical leads. The lapping guide includes an electronic lapping guide resistive element disposed for electrical communication with the sensor electrical leads. The resistive element has a predetermined height in a lapping direction and is adapted to produce an electrical resistance in the presence of a lapping current that increases as said resistive element height is reduced during lapping. A lapping method and a method of forming the onboard electronic lapping guide are also disclosed.

30 Claims, 11 Drawing Sheets

LAPPING DIRECTION

ONBOARD MULTIPHASE ELECTRONIC LAPPING GUIDE DESIGN FOR MR HEADS

BACKGROUND OF THE INVENTION

1. Field of the Invention

The present invention relates to magnetoresistive and giant magnetoresistive sensors for reading magnetically-recorded information from data storage media, and particularly to methods for lapping such heads during manufacturing.

2. Description of the Prior Art

By way of background, magnetic media-based DASD systems, such as disk drives, use magnetoresistive and giant magnetoresistive sensors (hereinafter collectively referred to as "MR" sensors) to read data recorded on the storage media. An MR sensor is a magneto-electrical device that produces a variable voltage output in response to magnetic field fluctuations emanating from the recorded magnetic domains that represent stored information. The MR sensors used in disk drives are commonly integrated with inductive write heads to form merged read/write heads. Such heads are conventionally formed by building thin film layer structures on a wafer substrate. The wafer substrate is then divided into multiple slider bars that each carry a row of multiple (e.g., 60) read/write heads. Processing of the slider bars into finished read/write heads requires lapping along one longitudinal edge of the slider bar to precisely define an air bearing surface (ABS) of each read/write head, followed by division of the slider bar into individual heads.

Slider bar lapping is typically performed as a wet grinding process in which material is removed to define a read head parameter known as "stripe height" for each of the read/write heads on the slider bar. Stripe height is the distance from the ABS to the back of each MR sensor. It is a parameter that greatly influences sensor responsiveness to recorded magnetic domains, and thus must be carefully controlled. The conventional technique used to monitor slider bar lapping is by way of one or more electronic lapping guides (ELGs) formed in kerf areas of the slider bar. Each ELG includes an electrically conductive sensor structure whose ends are connected to electrical leads that carry current from a control circuit. Lapping is controlled by sensing resistance increases in the ELG as sensor material is removed by the grinding process. The ELG resistance increases are used to determine changes in MR sensor stripe height so that the lapping process can be terminated at the required stripe height.

It is to improvements in the ELG art that the present invention is directed. In particular, the invention addresses the need for increased lapping accuracy and reduced variability in final stripe height from one slider to another during manufacturing.

SUMMARY OF THE INVENTION

The foregoing problems are solved and an advance in the art is obtained by an onboard electronic lapping guide for lapping a magneto-resistive head having a magneto-resistive sensor element connected between a pair of sensor electrical leads. The lapping guide includes an electronic lapping guide resistive element that is also connected between the sensor electrical leads so as to form part of the in-process head structure. The lapping guide resistive element has a predetermined height in a lapping direction and is adapted to produce an electrical resistance in the presence of a lapping current that increases as the resistive element height is reduced during lapping. The lapping process ultimately consumes the ELG and produces a finished MR sensor.

In preferred embodiments of the invention, the resistive element is disposed between the sensor element and a portion of the head that will receive a lapping tool, and comprises two resistive elements providing a coarse lapping guide and a fine lapping guide. The coarse lapping guide has a greater width and height than the fine lapping guide. The coarse lapping guide is separated from the fine lapping guide by a gap that is of sufficient height to support a lapping clean-up phase. The fine lapping guide may have a height corresponding to a height of the sensor element, and has a width corresponding to a track width of the sensor element. The sensor electrical leads can be shaped to define the width of the fine lapping guide and the track width of the sensor element, and to further define a width of the coarse lapping guide that is larger than the fine lapping guide width and the sensor element track width. The resistive element and the sensor element may comprise identical thin film layers.

The invention further contemplates a lapping method and a method of forming the onboard electronic lapping guide.

BRIEF DESCRIPTION OF THE DRAWING

The foregoing and other features and advantages of the invention will be apparent from the following more particular description of preferred embodiments of the invention, as illustrated in the accompanying Drawing, in which:

FIG. 19b is a second graph showing the first derivative of the curve of FIG. 19a; and FIG. 19c is a third graph showing the second derivative of the curve of FIG. 19a;

DETAILED DESCRIPTION OF PREFERRED EMBODIMENTS

Figure 1:
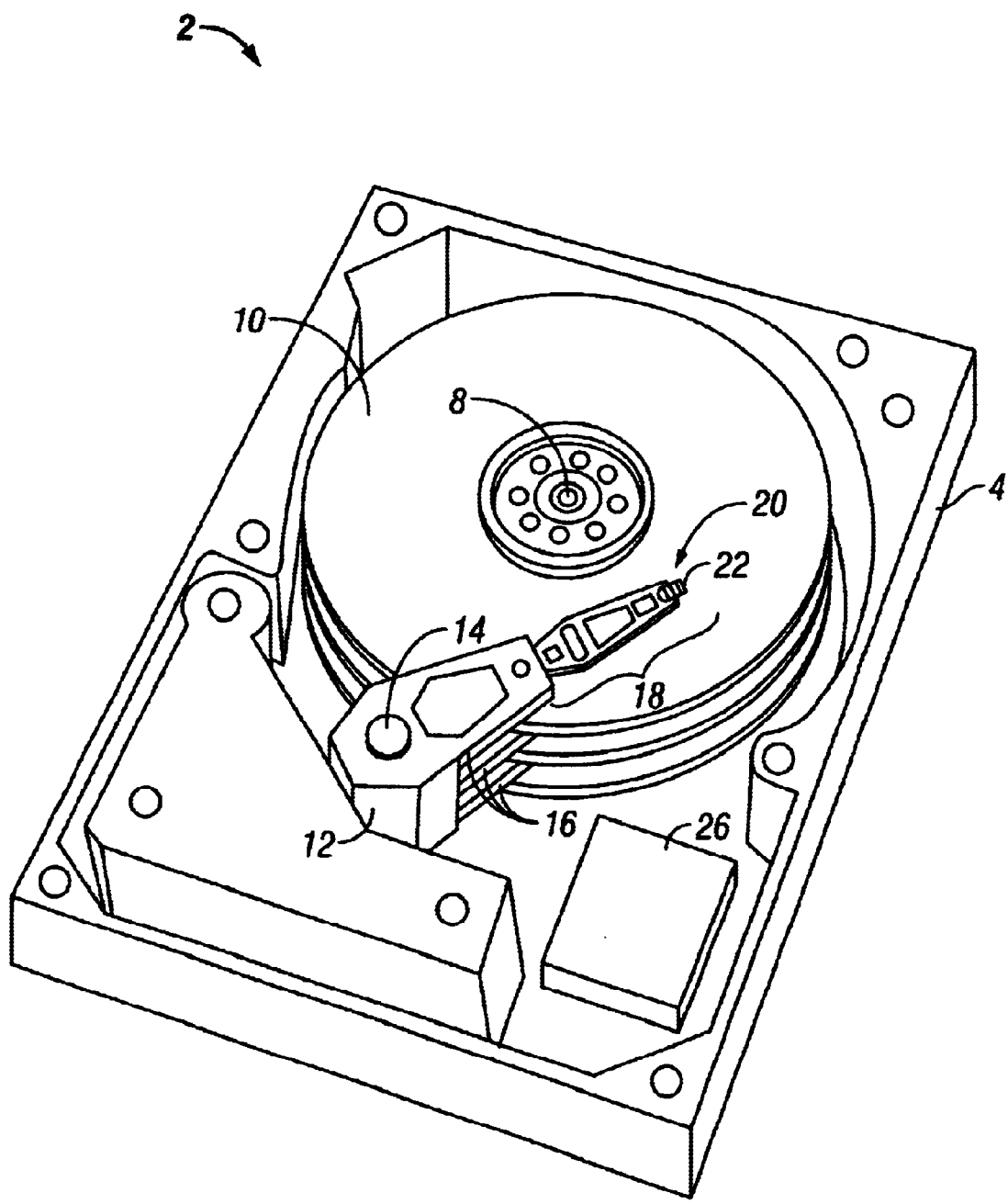
FIG. 1 is a perspective view showing a disk drive incorporating an MR read head constructed in accordance with the invention.
Figure 2:
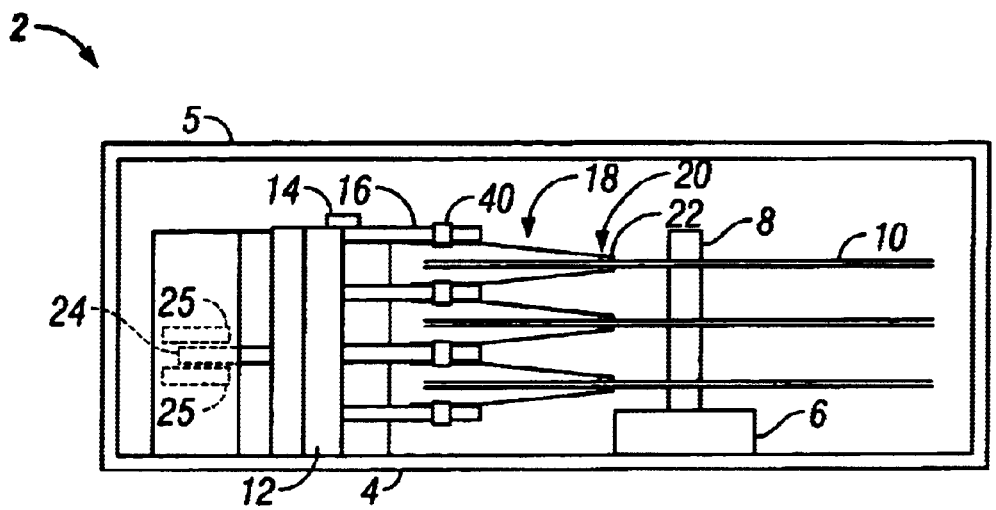
FIG. 2 is a side elevational view showing the interior of the disk drive of FIG. 1.
Figure 3:
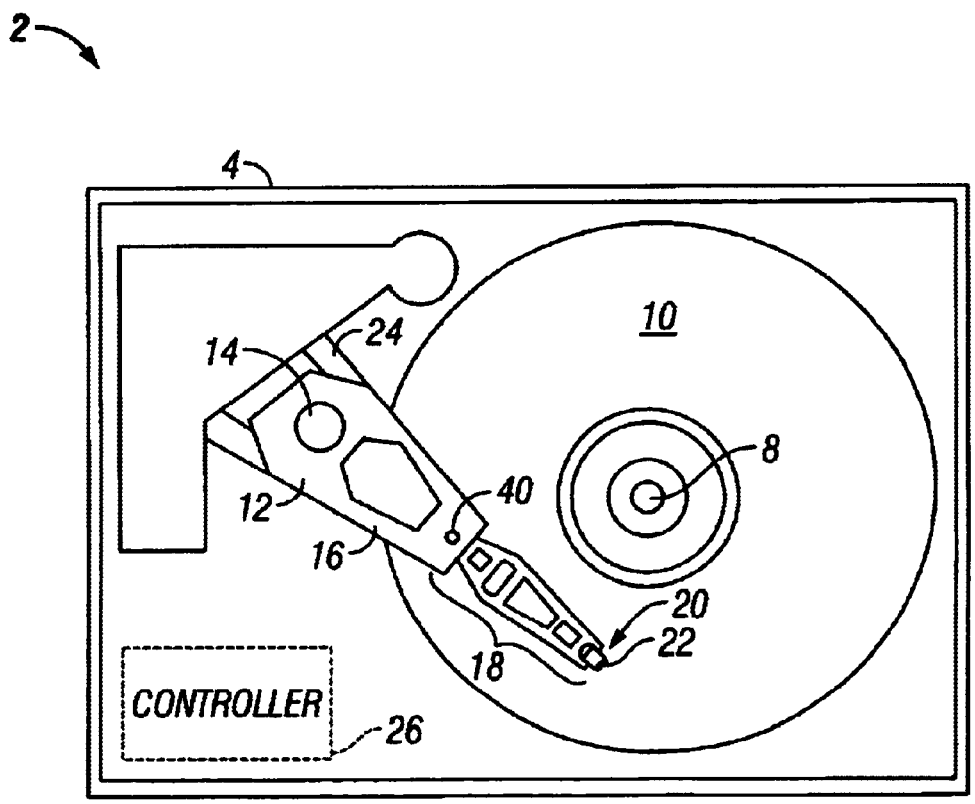
FIG. 3 is a plan view of the disk drive of FIG. 1.

Turning now to the figures (which are not necessarily to scale), wherein like reference numerals represent like elements in all of the several views, FIGS. 1–3 illustrate an exemplary disk drive 2 that incorporates an MR read head constructed in accordance with the invention. Note that the disk drive 2 is shown in greatly simplified schematic form, with only those construction details that are necessary for an understanding of the invention being represented. As to these illustrated components, it should be understood that all are conventional in nature unless otherwise indicated below.

The disk drive 2 conventionally includes a base casting 4 made from aluminum or other suitable material. A cover 5 is removably mounted thereto via a hermetic seal (not shown). The base casting 4 supports a conventional spindle drive motor 6 having an associated drive spindle 8. The drive spindle 8 carries a set of disks 10 for high speed rotation therewith. The disks 10 form a spaced vertically stacked disk platter arrangement. Each disk 10 is conventionally formed from an aluminum or glass substrate with appropriate coatings being applied thereto such that at least one, and preferably both, of the upper and lower surfaces of the disks are magnetically encodable and aerodynamically configured for high speed interaction with a read/write transducer (described below).

Data access to the disk surfaces is achieved with the aid of an actuator 12 that is mounted for rotation about a stationary pivot shaft 14. The actuator 12 includes a set of rigid actuator arms 16 that respectively carry either one or two flexible suspensions 18 (see FIG. 2). Each suspension 18 supports a slider 20 and a transducer 22 that are positioned to interact with an associated disk surface, representing the transducer's recording medium. The sliders 20 are aerodynamically designed so that when the disks 10 are rotated at operational speed, an air bearing develops between each slider and its associated disk surface. The air bearing is very thin (typically 0.05 µm) so that the transducers 22 are positioned in close proximity to the recording media. A conventional voice coil motor 24 is provided for pivoting the actuator 12. This motion sweeps the actuator arms 16 and their slider-carrying suspensions 18 generally radially across the respective surfaces of the disks 10, allowing the transducers 22 to be positioned from one concentric data track to another during seek, settle and track following operations of the drive 2.

As described in more detail below, each transducer 22 is an integrated device that includes a magnetic write head and an MR sensor read head constructed in accordance with the invention. Data is read from the disks 10 by the read head portion of each transducer 22. This data is processed into readback signals by signal amplification and processing circuitry (not shown) that is conventionally located on each actuator arm 16. The readback signals carry either customer data or transducer position control information depending on whether the active read head is reading from a customer data region or a servo region on one of the disks 10. The readback signals are sent to the drive controller 25 for conventional processing. Data is recorded on the disks 10 by the write head portion of each transducer 22. This data is provided by write data signals that are generated by the controller 25 during data write operations. The write data signals are delivered to whichever write head is actively writing data. The active write head then records the positive and negative magnetic domains representing digital information to be stored onto the recording medium.

Figure 4:
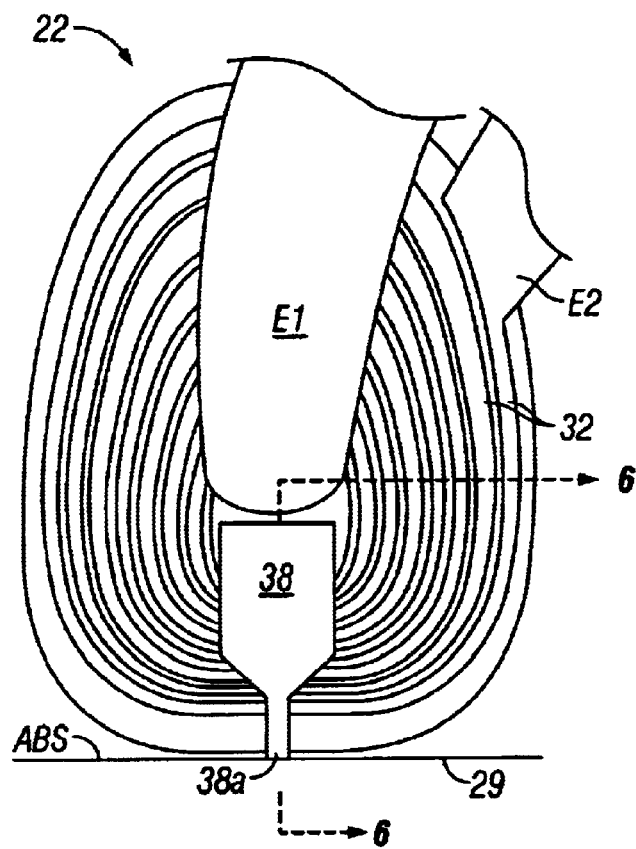
FIG. 4 is a plan view of an integrated read/write transducer for use in the disk drive of FIG. 1.
Figure 5:
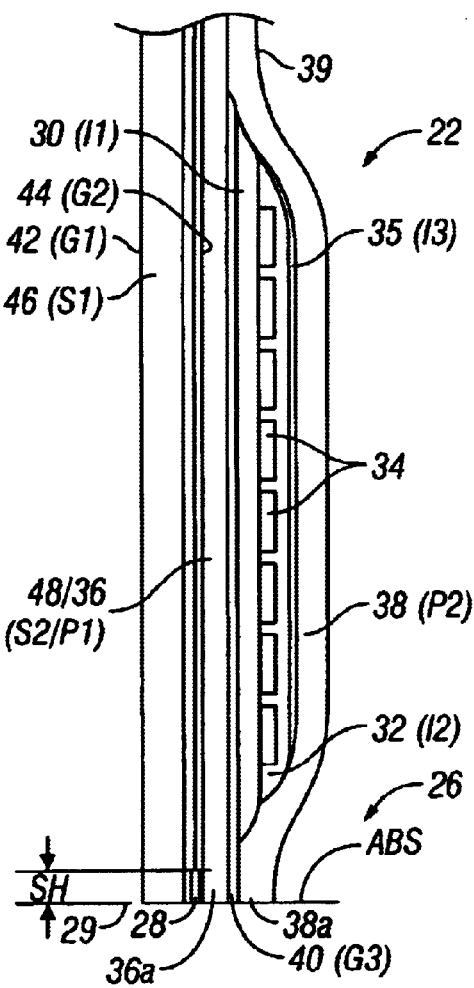
FIG. 5 is a side elevational view of the transducer of FIG. 4.
Figure 6:
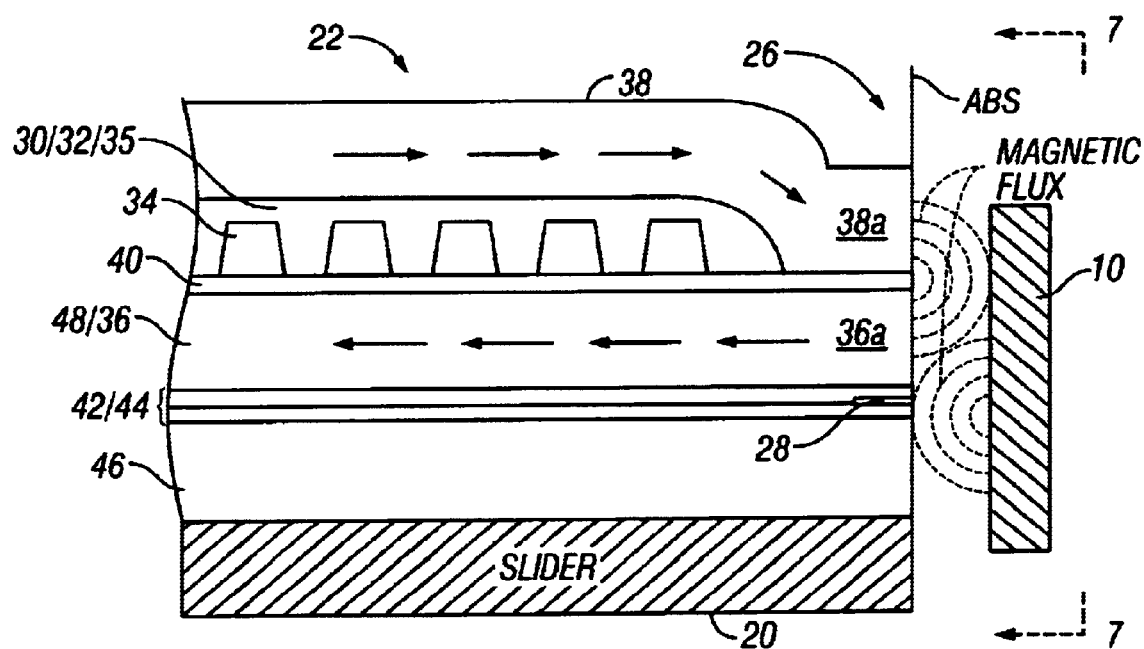
FIG. 6 is a cross-sectional view taken along line 6—6 in FIG. 4.
Figure 7:
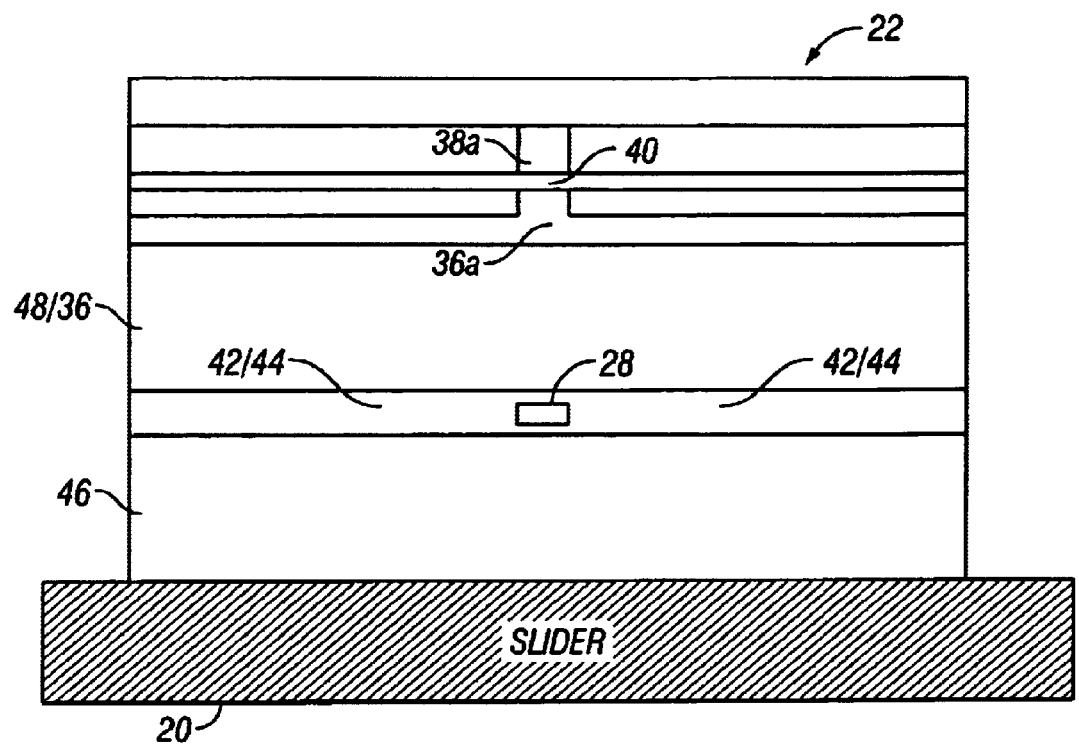
FIG. 7 is an ABS view of the transducer of FIG. 3 taken in the direction of arrows 7—7 in FIG. 6.

Turning now to FIGS. 4–7, an exemplary one of the transducers 22 is shown as including a transducer write head portion 26 and a transducer read head portion 28. In FIGS. 4–6, the transducer 22 is shown as being lapped at 29 to form an air bearing surface (ABS) where the transducer magnetically interacts with the adjacent rotating disk surface. The ABS 29 is spaced from the disk surface during drive operations by virtue of the above-described air bearing. FIG. 7 depicts the transducer 22 from the vantage point of the disk surface, looking toward the ABS 29.

The write head 26 conventionally includes a first insulative layer 30 (commonly referred to as "I1") supporting a second insulative layer 32 (commonly referred to as "I2") that carries plural inductive coil loops 34. A third insulative layer 35 (commonly referred to as "I3") can be formed above the coil loops 34 for planarizing the write head 26 to eliminate ripples in the I2 insulative layer 32 caused by the coil loops. The coil loops 34 inductively drive first and second pole pieces 36 and 38 that form the yoke portion of the write head 26. The pole pieces 36 and 38 respectively extend from a back gap 39 to pole tips 36a and 38a located at the ABS 29. An insulative gap layer 40 (commonly referred to as "G3") is sandwiched between the pole pieces 36 and 38 to provide a magnetic write gap at the pole tips 36a and 38a. Note that the pole piece 36 is commonly referred to as a "P1" pole piece. The pole piece 38 may be referred to as a "P2" or "P3" pole piece depending on how the pole tip 38a is formed. It is labeled as "P2" in FIG. 5. During data write operations, electrical current passing through a pair of electrical leads E1 and E2 to the coil loops 34 generates a magnetic field that induces a magnetic flux in the P1 and P2 layers 36 and 38. As shown in FIG. 6, this magnetic flux propagates from the yoke to the pole tips 36a and 38a, where it fringes across the gap layer 40 at the ABS 29. This causes magnetic domains to be formed on an adjacent recording surface of one of the disks 10. The orientation of each recorded magnetic domain is dependent on the magnetization direction of the pole tips 36a and 38a, which in turn is determined by the direction of the electrical current passing through the coil loops 34. Reversing the coil's electrical current reverses the magnetization direction of the pole tips 36a and 38a, and consequently reverses the orientation of the next recorded magnetic domain. This magnetization reversal process is used to encode data on the recording medium.

The read head 28 lies between insulative gap layers 42 and 44 at the ABS 29, where it is influenced by magnetic flux emanating from the adjacent disk surface. The gap layers 42 and 44 are commonly referred to as "G1" and "G2" gap areas, and are sandwiched between a first magnetic shield layer 46 (commonly referred to as an "S1" shield) and second magnetic shield layer 48 (commonly referred to as an "S2" shield). In some designs, including that of FIG. 5, the S2 shield layer 48 also provides the P1 pole piece 36. The P1 shield layer 46 is conventionally formed over the slider 20, which is only partially shown in FIGS. 5 and 6 for clarity.

As mentioned above by way of background, one important dimension of the read head 28 that must be carefully controlled is its stripe height (SH), as best shown in FIG. 5. The stripe height dimension is established by lapping the face of the transducer 22 while carefully monitoring the amount of material removed using an ELG. Applicants have determined that it would be desirable to define an ELG lithographically using the same lithographic stepper tool and mask used to define the stripe height of an MR sensor portion of the read head 28 (i.e., the back edge of the sensor that is remote from the ABS). This would reduce the variability in final stripe height induced by the lapping process. For reasons that will become clear from the ensuing description, the stripe height must be defined at very high resolution in order to maximize the overlap of the stripe height-defining mask with the mask used to define the sensor's track width. As explained in more detail below, this will ensure that there is a minimal increase in electrical resistance due to undesired removal of lead material as a result of etching the ferromagnetic layers of the sensor.

Conventional high resolution stepper tools do not offer large enough field sizes (~26 mm) to accommodate typical lapping row lengths (~50 mm). As such, if it is desired to lap an entire slider bar using high resolution steppers, multiple fields that are separately lithographically defined must be stitched together to form a lapping row. Inevitable stitching errors at the field boundaries would add to tolerances of stripe height after lapping the row. Lapping of sliders individually would solve the stitching problem, but requires a method of controlling lapping progress on an individual slider basis. Applicants thus propose the use of onboard ELGs formed on individual sliders, allowing for per-slider lapping, or optionally for the lapping sliders in small groups no larger than the stepper tool's field of view.

Figure 8:
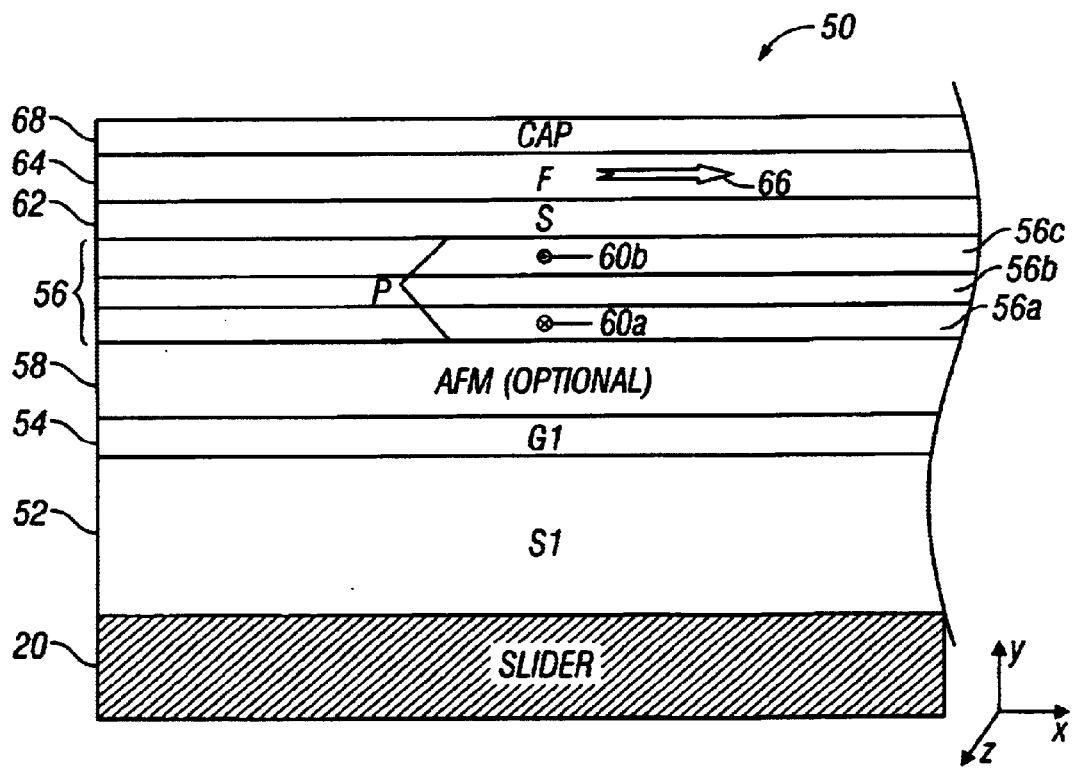
FIG. 8 is a cross-sectional view showing an exemplary MR sensor layer structure following cap layer deposition and prior to formation of an onboard lapping guide in accordance with the invention.

Turning now to FIG. 8 (in which the vertical scale is greatly exaggerated), an exemplary process of forming an onboard ELG may begin with conventional formation of the sensor layer structure 50 shown therein. As in the case of FIG. 7, the view of FIG. 8 is taken on a plane that is parallel to the ABS of the sensor to be constructed from the sensor layer structure 50. The "x" axis in FIG. 8 represents the radial track width direction of the sensor to be formed. The "y" axis in FIG. 8 represents the gap width direction of the sensor. The "z" axis represents the direction pointing perpendicularly away from the sensor ABS and toward the disk medium that the sensor will read.

The sensor layer structure 50 begins with an S1 shield layer 52 that will provide the S1 shield layer 46 of FIG. 5 and a G1 gap layer 54 that will provide the G1 gap layer 42 of FIG. 5. As is conventional, the shield layer 54 is made from a non-ferromagnetic electrically conductive material, while the G1 gap layer 54 is made from an electrically insulative material. By way of example only, the sensor layers 50 are arranged to provide a "bottom-type" spin valve sensor. The first ferromagnetic layer of the sensor to be formed is a ferromagnetic pinned (P) layer 56 whose magnetization direction is fixed perpendicular to the plane of FIG. 8. Although the pinned layer 56 could be self pinned, for example, by forming it with very high positive magnetostriction and very large compressive stress (according to existing techniques), FIG. 8 shows an implementation wherein the pinned layer 56 is externally pinned by an optional antiferromagnetic (AFM) pinning layer 58. The pinning layer 58 is deposited to a suitable thickness on one or more conventional seed layers (not shown) that are formed on top of the G1 gap layer 54. The pinning layer 58 can be made from platinum-manganese (Pt—Mn), nickel-manganese (Ni—Mn), iridium-manganese (Ir—Mn), or any other suitable antiferromagnetic material that is capable of exchange biasing the ferromagnetic material in the pinned layer 56.

The pinned layer 56 can be implemented in conventional fashion as a single layer ideally having one magnetization direction, or as plural sub-layers ideally having parallel and anti-parallel magnetization directions. FIG. 8 shows an example of the latter configuration, with the pinned layer 56 being formed by growing a first sublayer 56a of cobalt-iron (CoFe), a second sublayer 56b of ruthenium (Ru), and a third sublayer 56c of cobalt-iron (CoFe). These sublayers are formed on top of the pinning layer 58 at suitable thickness. The magnetic moment of the first sublayer 56a is shown by the arrow tail 60a, which points into the plane of FIG. 8. The magnetic moment of the third sublayer 56c is shown by the arrowhead 60b, which points out of the plane of FIG. 8. The magnetic moments 60a and 60b are thus antiparallel to each other and oriented generally perpendicular to the plane of FIG. 8.

As stated, the pinned layer 56 will have its magnetic moment fixed by interfacial exchange coupling with the pinning layer 58. The magnetization direction(s) of the pinned layer 56 will be sufficiently fixed by the exchange-biasing pinning layer 58 to prevent rotation thereof in the presence of relatively small external magnetic fields, such as the fields produced by magnetic domains recorded on the adjacent disk surface.

A spacer layer 62 is formed on top of the pinned layer 56 as a suitably thick deposit of an electrically conductive, non-ferromagnetic material, such as Cu.

The sensor's free layer 64 is formed above the spacer layer 62. The free layer 64 can be made by covering the spacer layer 62 with a single layer of Co, Co—Fe, Ni—Fe or other suitable ferromagnetic material grown to a suitable thickness. In an alternative configuration, the free layer 64 can be formed from multiple layers, such as a bilayer structure comprising a bottom sublayer of Co—Fe and a top sublayer of Ni—Fe, or a trilayer structure comprising a bottom sublayer of Co—Fe, a middle sublayer of Ni—Fe and a top sublayer of Co—Fe.

The arrow 66 in FIG. 8 shows the preferred zero bias point magnetization direction of the free layer 64 when the free layer is in a quiescent state with no magnetic field incursions thereon. A protective cap layer 68 is formed on the surface of the free layer 64 in order to protect the free layer prior to the deposition of subsequent structural layers. The cap layer 68 is conventionally made from tantalum or other suitable material.

It should be noted that the sensor layer structure 50 of FIG. 8 is a full wafer structure that is used to form a large number of sensors. As such, the next sensor fabrication step is the definition of individual sensors on the wafer, with each sensor having its own onboard ELG. Alternatively, if multiple sensors will be lapped as a group, at least one of the sensors will be constructed with an onboard ELG.

Figure 9:
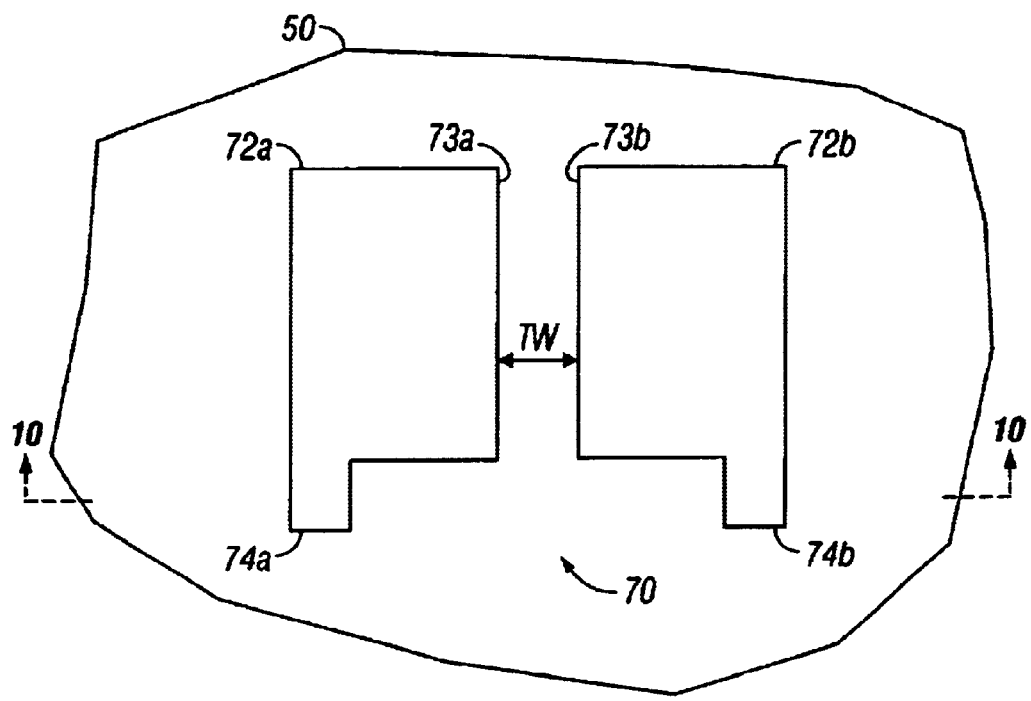
FIG. 9 is a plan view showing a track width-defining, photoresist etch mask formed over the structure of FIG. 8.
Figure 10:
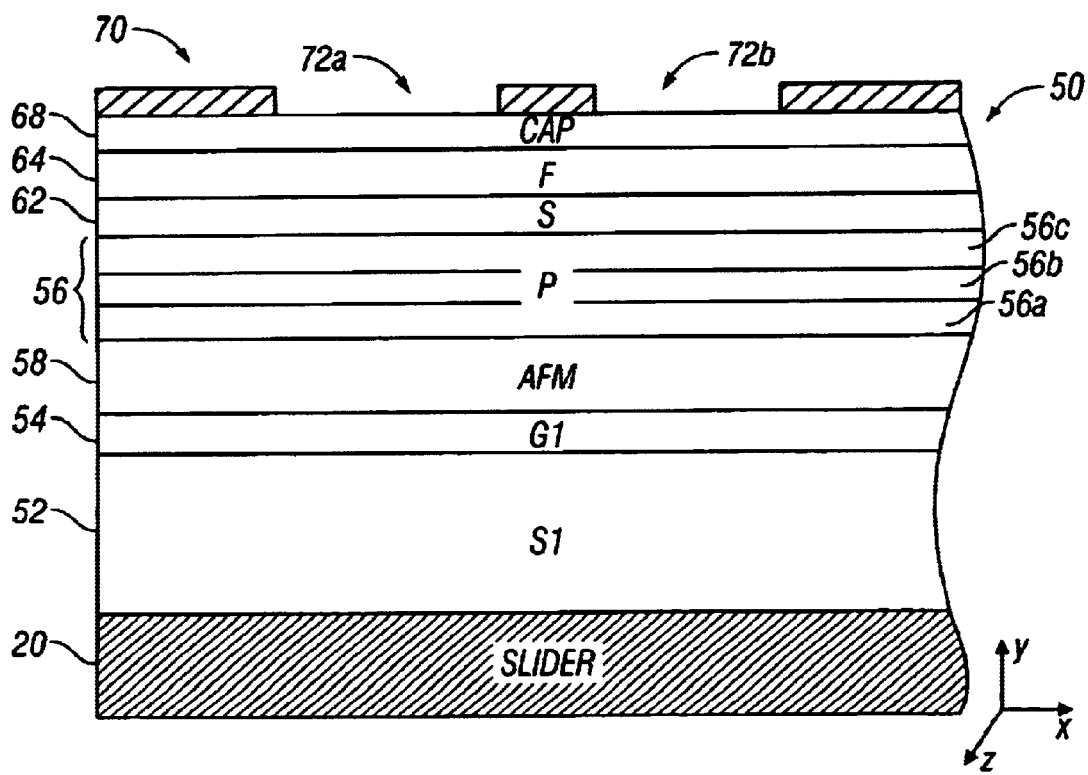
FIG. 10 is a cross-sectional view taken along line 10—10 in FIG. 9.

The process begins with the formation of a track width-defining, photoresist etch mask 70, as shown in FIGS. 9 and 10. The mask 70 can be constructed according to conventional techniques by first spin coating the cap layer 68 with a positive photoresist material. Then, with the aid of a high resolution lithographic stepper tool and a pattern mask, the photoresist is pattern-developed by optically exposing the areas 72a and 72b of FIG. 9. The material in the areas 72a and 72b is thereafter chemically removed by a photoresist developer solution (e.g., KOH, NaOH, or tetramethyl ammonium hydroxide) to expose the cap layer 68, as shown in FIG. 10.

It will be seen that the areas 72a and 72b are relatively narrowly spaced from each other along much of their adjacent inner edges (73a, 73b) to define a sensor track width dimension (TW). The areas 72a and 72b are then stepped at their ABS end to form relatively narrow legs 74a and 74b that will be used to provide part of the onboard ELG, as further described below.

Figure 11:
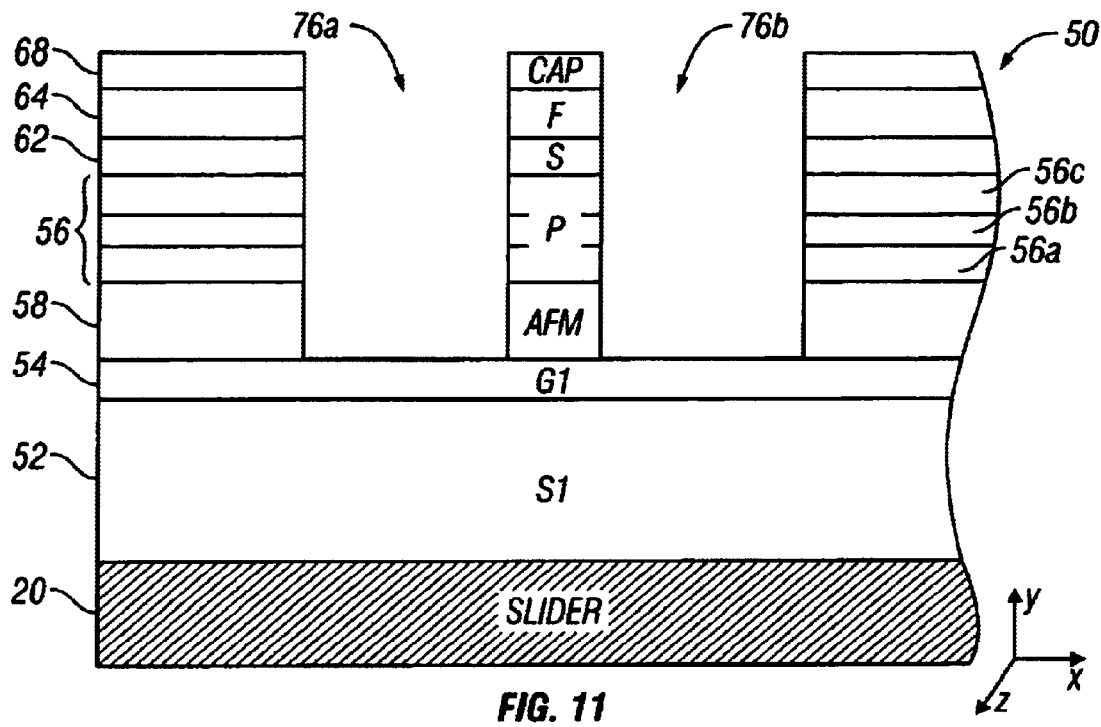
FIG. 11 is a cross-sectional view as in FIG. 10 following a track width defining etching step.
Figure 12:
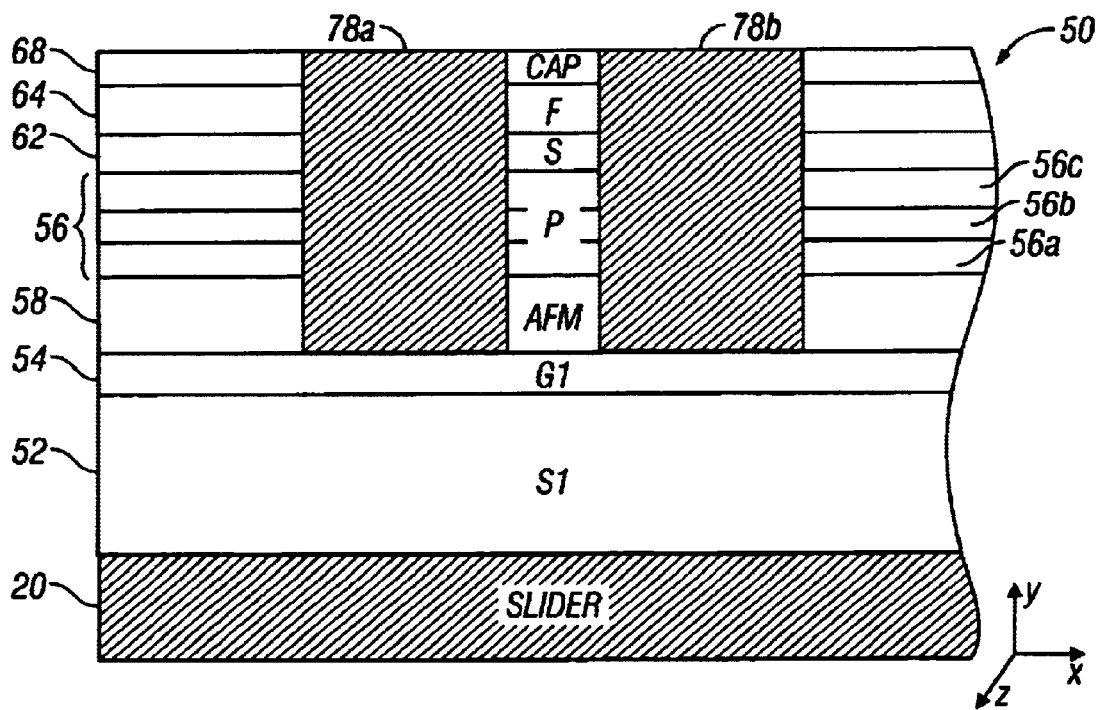
FIG. 12 is a cross-sectional view as in FIG. 10 following the deposition of sensor lead material in the etched areas of FIG. 11.

Turning now to FIGS. 11 and 12 (in which the vertical scale is again greatly exaggerated), the top of the sensor layer structure 50 is etched using a suitable etching process to remove sensor layer material down to the G1 gap layer 54 within the areas 72a and 72b. This forms a pair of trenches 76a and 76b, as shown in FIG. 11. As shown in FIG. 12, after removal of the photoresist mask 70, the trenches are filled by way of a suitable deposition process with a magnetic biasing material (e.g., CoPtCr) and an electrically conductive material, such as copper, to define a pair of sensor leads 78a and 78b.

Figure 13:
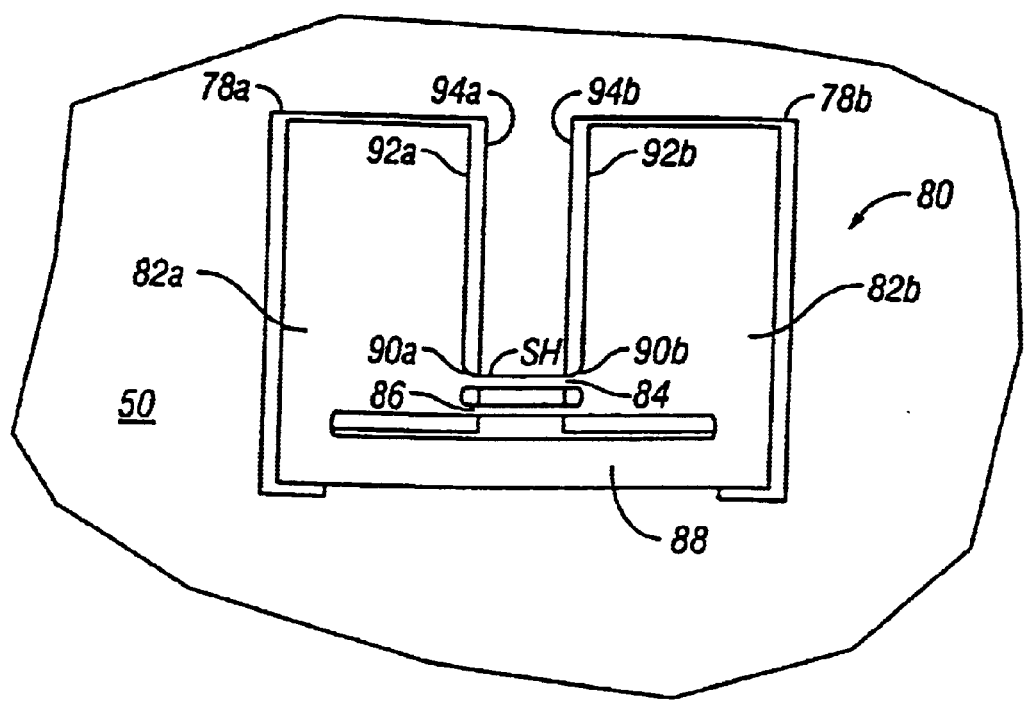
FIG. 13 is a plan view showing a stripe height-defining, photoresist etch mask formed over the structure of FIG. 12.

Turning now to FIG. 13, a stripe height-defining etch mask 80 is ready to be formed on top of the sensor structure 50. The mask 80 can be constructed according to conventional techniques by first spin coating the cap layer 68 with a positive photoresist material. Then, with the aid of a high resolution lithographic stepper tool and a pattern mask, the photoresist is pattern-developed by optically exposing all but the area 80 of FIG. 13. The material outside the area 82 is thereafter chemically removed by a photoresist developer solution (e.g., KOH, NaOH, or tetramethyl ammonium hydroxide) to expose the cap layer 68.

The material of layers 58—68 of the sensor layer structure 50 is now ready to be etched to define the back edge of the sensor stripe height dimension and complete the formation of the onboard ELG. To that end, it will be seen in FIG. 13 that the area 80 includes a pair of large generally rectangular mask regions 82a and 82b that substantially cover the sensor leads 78a and 78b. Extending between the regions 82a and 82b are three horizontal mask sections 84, 86 and 88. As described in more detail below, the section 84 is used to define a sensor stripe height back edge location and the sections 84 and 86 are used to define an onboard ELG in conjunction with the sensor leads 78a and 78b. Importantly, it will be seen that there are small filets where the horizontal sections 84, 86 and 88 meet the rectangular regions 82a and 82b. These filets are present as a result of resolution limitations of the stepper tool used to define the mask 80. The lower the resolution, the larger the filets, and visa versa. This limitation is of particular concern with respect to the filets 90a and 90b, where the upper edge of the horizontal section 84, which defines the back edge of the sensor stripe height dimension, meets the horizontal regions 82a and 82b. Because of the filets 90a and 90b, the inner opposing edges the rectangular regions 82a and 82b, respectively shown by reference numerals 92a and 92b, cannot be brought into alignment with the inner opposing edges of the sensor leads 78a and 78b, which are shown by reference numerals 94a and 94b. To do so would cause the stripe height to flare out at the filets 90a and 90b.

Recessing the edges 92a and 92b of the mask 80 from the edges 94a and 94b of the sensor leads 78a and 78b solves the foregoing problem. However, the sensor lead edges 94a and 94b are exposed to subsequent etching (described below) and will therefore be thinned. This tends to undesirably increase sensor leads resistance. Therefore, it is desirable to employ a stepper tool with the highest possible resolution, so that the amount of edge recessing of the mask 80 is minimized, and sensor leads etching and resultant resistance increase is not excessive.

Figure 14:
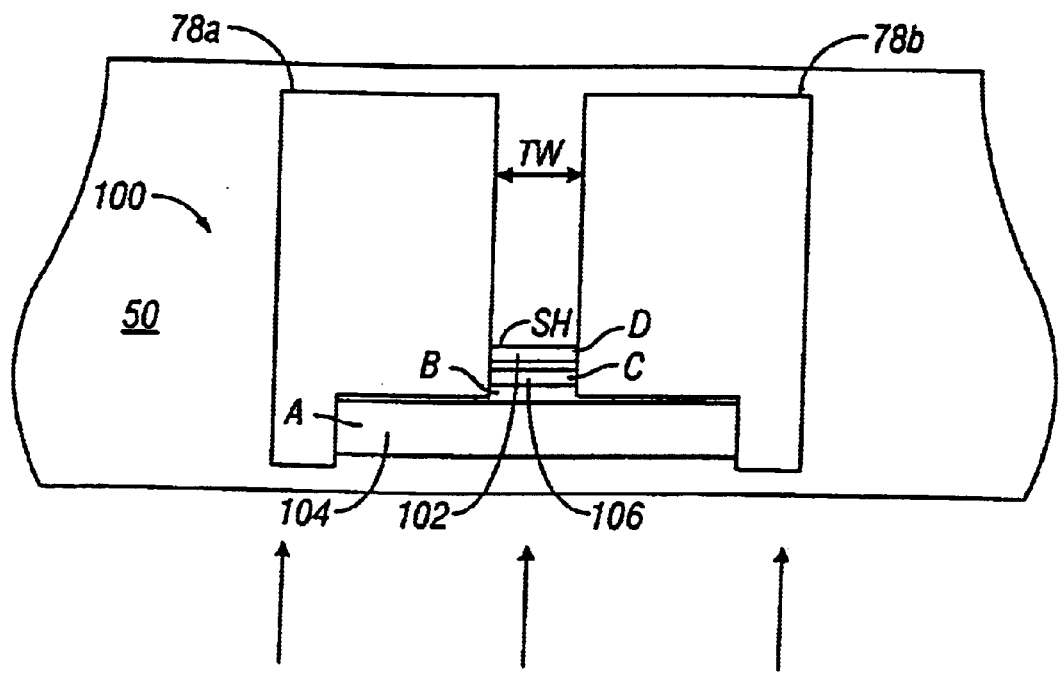
FIG. 14 is a plan view showing an MR sensor structure with an onboard ELG in accordance with the invention following etching to remove sensor material outside the stripe height-defining, photoresist mask of FIG. 13.

Turning now to FIG. 14, the top of the sensor layer structure 50 is etched using a suitable etching process to remove sensor layer material down to the G1 gap layer 54 outside the mask 80. This forms a composite structure 100 that combines an MR sensor with an onboard ELG. The composite structure 100 includes the sensor leads 78a and 78b. It also includes an unlapped MR sensor element 102 and ELG resistive elements 104 and 106, all of which are in electrical communication with the sensor leads 78a and 78b. The MR sensor element 102 has a defined sensor track width (TW) and stripe height (SH) back edge as a result of the processing steps described above. All that is required to transform the composite structure 100 into a completed MR sensor is lapping to remove material and define an ABS along a lapped edge of the sensor element 102. The ELG resistive elements 104 and 106 are used for this purpose. In particular, by attaching the sensor leads 78a and 78b to a conventional lapping apparatus (not shown), a lapping current may be passed through the ELG resistive elements 104 and 106. The ELG resistive elements 104 and 106 are disposed between the MR sensor element 102 and the lapping tool that engages the composite structure 100. Each has a corresponding electrical resistance to the lapping current that is dependent on the height of each element in the lapping direction. By programming the control system of the lapping apparatus, lapping can be performed in the manner described in more detail below, with the ELG resistive element 104 providing a coarse lapping guide that is used during a first coarse lapping phase and the ELG resistive element 106 providing rate-determining guide that is used during a third rate-determining lapping phase.

A four-phase lapping procedure will now be described for transforming the composite structure 100 into a finished MR sensor. Initially, it will be appreciated that the composite structure 100 may be removed from the other like structures on the full wafer layer structure 50 using conventional techniques. The composite structure 100 and all of its companions may then be lapped individually. Alternatively, a group of composite structures 100 formed by the same lithographic process within the resolution of the stepper tool and comprising part of a single slider bar may be lapped as a group. Note that in the latter case, it is not necessary to form an onboard ELG in association with each MR sensor. Instead, it may be enough to form onboard ELGs on one or two sensors of the lapping group.

Figure 15:
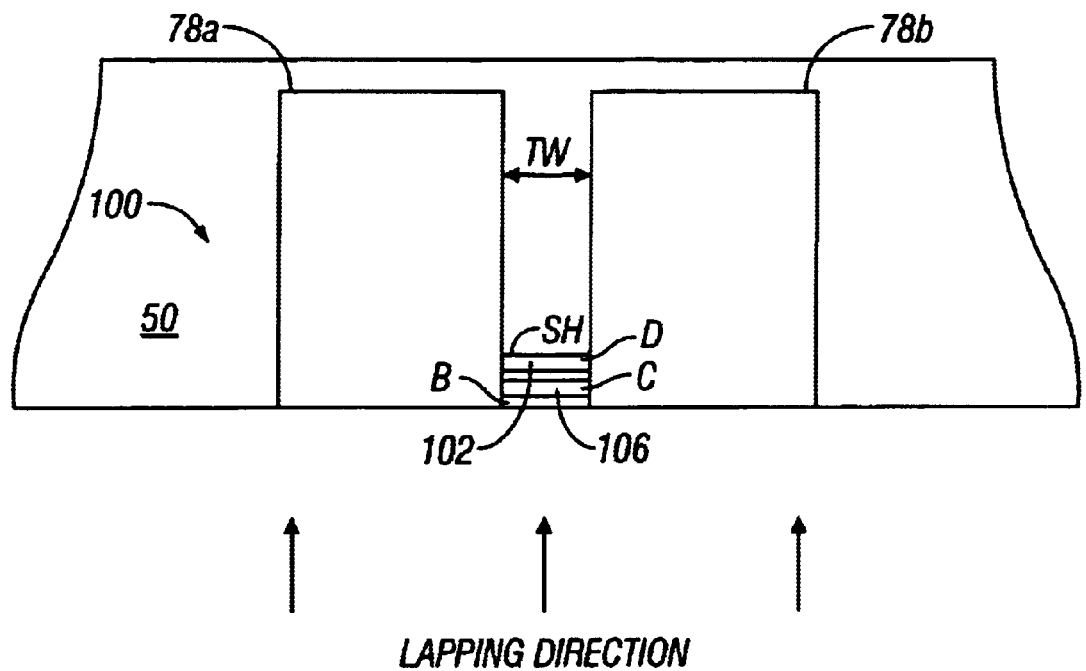
FIG. 15 is a plan view of the structure of FIG. 14 following a first coarse lapping phase.

The four zones labeled A, B, C and D in FIG. 14 correspond to the four lapping phases. The first lapping phase corresponding to zone A is a coarse lapping phase in which a large amount of material is removed. Note that the ELG resistive element 104 has a relatively long span for maximum sensitivity. FIG. 15 shows the result of the first lapping phase. The ELG resistive element 104 has been removed to eliminate zone A and zone B has been reached.

Figure 16:
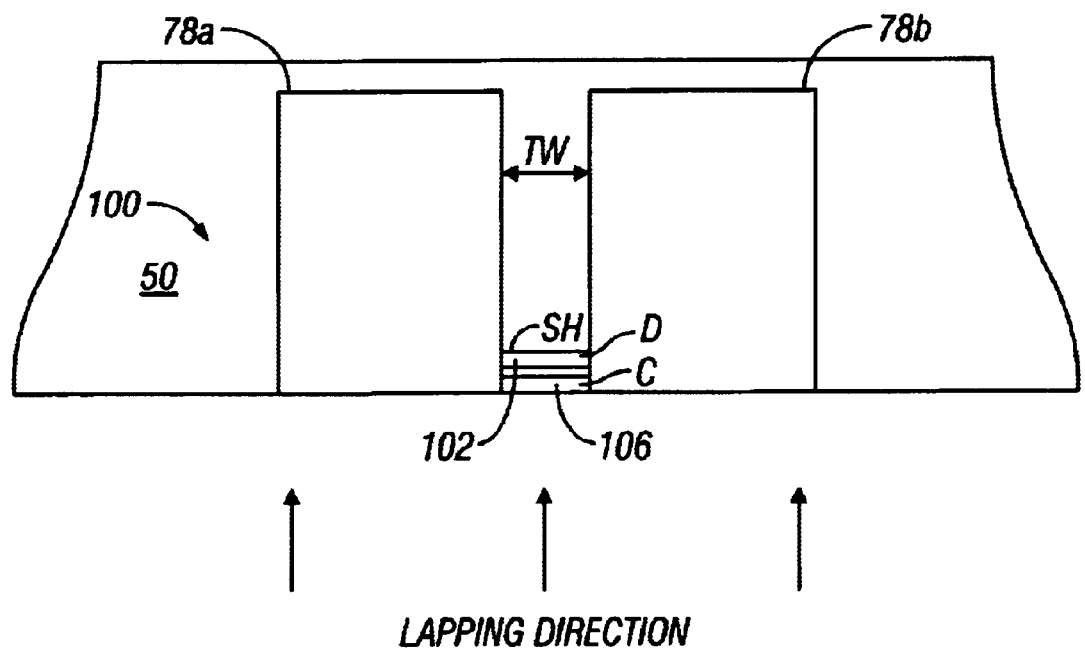
FIG. 16 is a plan view of the structure of FIG. 14 following a second clean-up lapping phase.

The second lapping phase corresponding to zone B is a clean up phase in which smeared material is removed to reduce noise during subsequent lapping phases. By way of example only, the height of zone B (in the lapping direction) may be approximately 500 nm. FIG. 16 shows the result of the second lapping phase. Material has been removed to eliminate zone B and the lapping tool is ready to begin lapping zone C.

Figure 17:
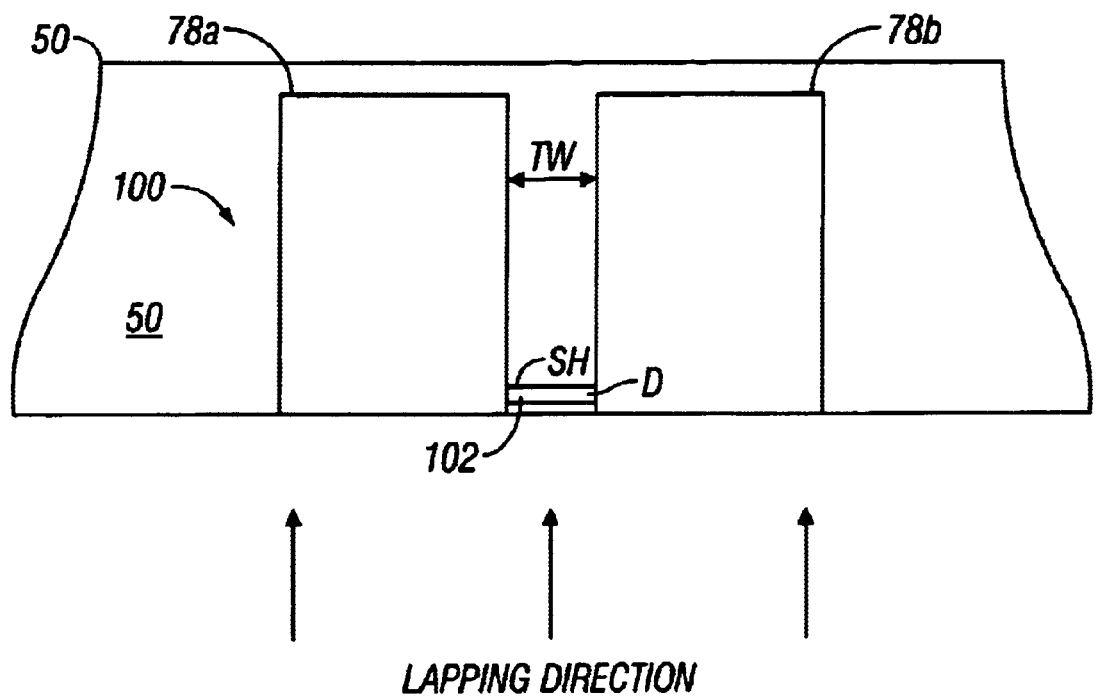
FIG. 17 is a plan view of the structure of FIG. 14 following a third rate-determining lapping phase.

The third lapping phase corresponding to zone C is used to establish a fine phase lapping rate for the final lapping phase. To that end, the height of the ELG resistive element 106 (in the lapping direction) is carefully controlled (e.g., at 200 nm) with clear starting and ending points. Preferably, the height of the ELG resistive element 106 corresponds to the height of the MR sensor element 102. The time required to lap through zone C is monitored and compared to the zone height to calculate the fine-phase lapping rate. FIG. 17 shows the result of the third lapping phase. The ELG resistive element 106 has been removed to eliminate zone C.

Figure 18:
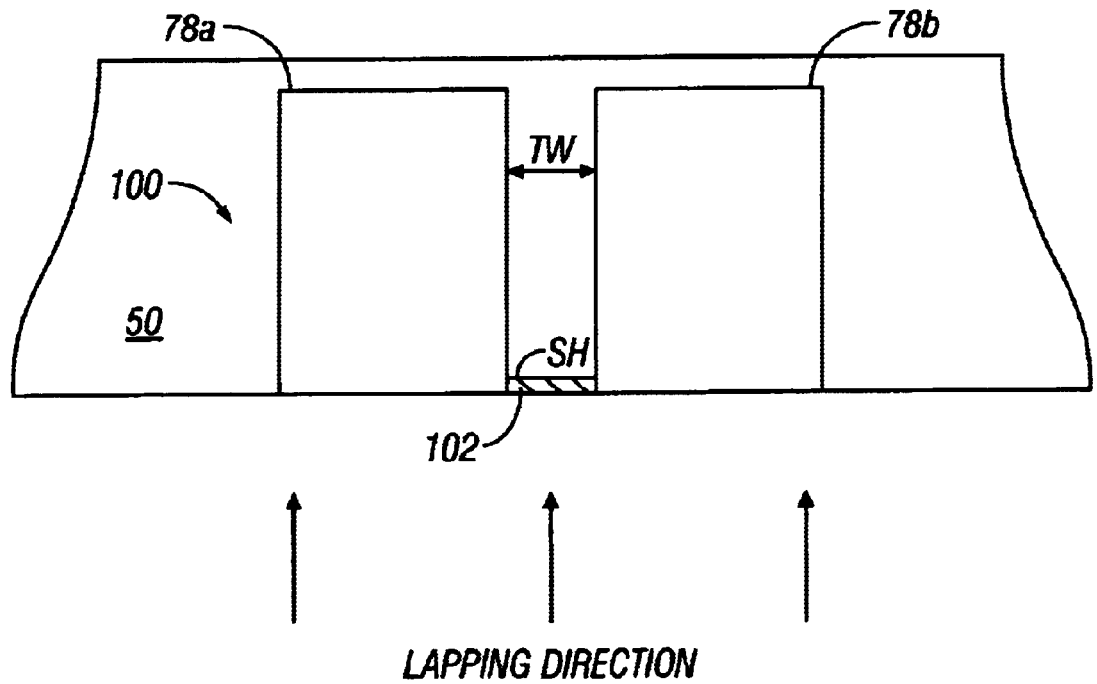
FIG. 18 is a plan view of the structure of FIG. 14 following a fourth fine trim lapping phase.
Figure 19A:
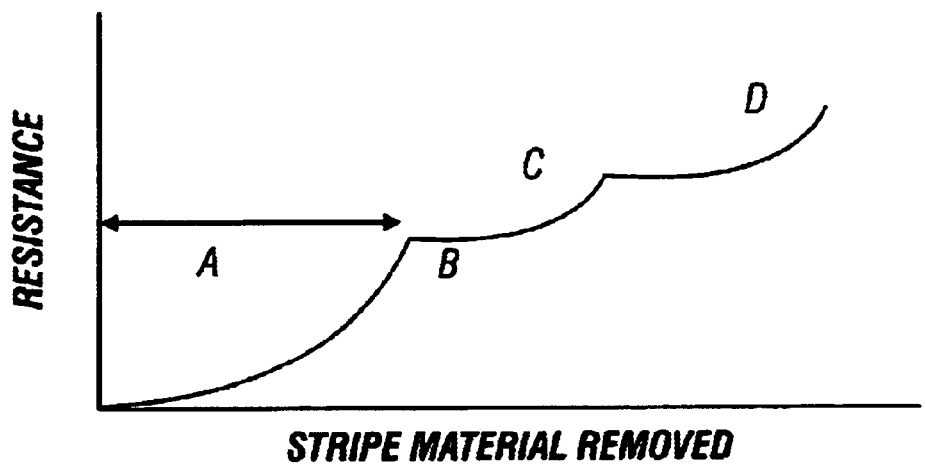
FIG. 19a is a first graph showing change in ELG resistance versus stripe material removal when lapping the sensor structure of FIG. 14 using its onboard ELG.
Figure 19B:
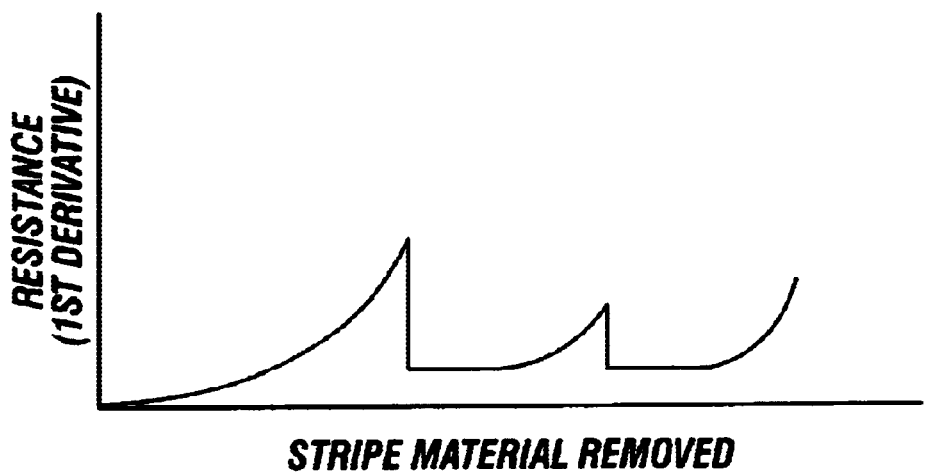
Figure 19C:
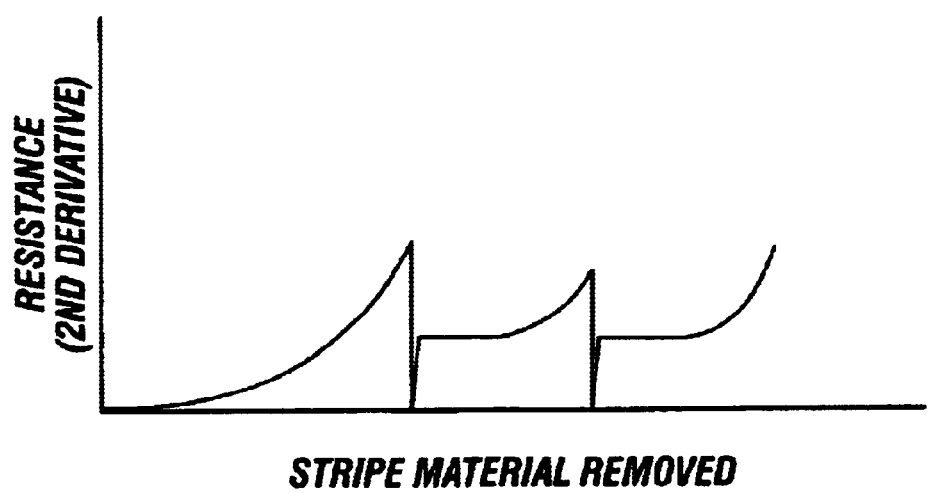

The fourth lapping phase is used to trim a prescribed amount of the sensor element 102 from a starting width by a desired amount (e.g., approximately 200 nm) to form the final stripe height. The amount of material removed is calculated based on the fine-phase lapping rate determined in phase 3 and the elapsed time. FIG. 18 shows the result of the fourth lapping phase.

FIGS. 18a, 18b and 18c show descriptive plots of resistance and derivatives thereof through each of the four lapping regions A, B, C and D. In FIG. 18a, ELG resistance is plotted directly against elapsed lapping time. FIG. 18b shows the first derivative of the resistance plot and FIG. 18c shows the second derivative. It will be seen that the lithographically defined edges of the MR sensor element 102 and the ELG resistive elements 104 and 106 provide clear starting and ending points (see second derivative plot) for lapping each region.

Accordingly, an MR sensor with an onboard ELG has been disclosed, together with a lapping method and an onboard ELG fabrication method. While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. An onboard electronic lapping guide for lapping a magneto-resistive head having a magneto-resistive sensor element disposed for electrical communication with a pair of sensor electrical leads, said lapping guide comprising:

an electronic lapping guide resistive element disposed for electrical communication with said electrical leads and spaced from said sensor element in a lapping direction;

said resistive element having a predetermined height in a lapping direction; and said resistive element being adapted to produce an electrical resistance in the presence of a lapping current that increases as said resistive element height is reduced during lapping.

2. A lapping guide in accordance with claim 1 wherein said resistive element is disposed between said sensor element and a portion of said head that will receive a lapping tool.

3. A lapping guide in accordance with claim 1 wherein there are two resistive elements providing a coarse lapping guide and a fine lapping guide.

4. A lapping guide in accordance with claim 3 wherein said coarse lapping guide has a greater width and height than said fine lapping guide.

5. A lapping guide in accordance with claim 3 wherein said coarse lapping guide is separated from said fine lapping guide by a gap that is of sufficient height to support a lapping clean-up phase.

6. A lapping guide in accordance with claim 3 wherein said fine lapping guide has a height corresponding to a height of said sensor element.

7. A lapping guide in accordance with claim 3 wherein said fine lapping guide has a width corresponding to a track width of said sensor element.

8. A lapping guide in accordance with claim 7 wherein said sensor electrical leads are shaped to define said width of said fine lapping guide and said track width of said sensor element, and to further define a width of said coarse lapping guide that is larger than said fine lapping guide width and said sensor element track width.

9. A lapping guide in accordance with claim 1 wherein said resistive element and said sensor element comprise identical thin film layers.

10. A lapping guide in accordance with claim 3 wherein said fine lapping guide, said coarse lapping guide and said sensor element comprise identical thin film layers.

11. A method of lapping a magneto-resistive head having a magneto-resistive sensor element disposed for electrical communication with a pair of sensor electrical leads, comprising:

forming an electronic lapping guide resistive element disposed for electrical communication with said electrical leads and spaced from said sensor element in a lapping direction;

said resistive element having a predetermined height in a lapping direction;

said resistive element being adapted to produce an electrical resistance in the presence of a lapping current that increases as said resistive element height is reduced during lapping;

passing a lapping current through said resistive element;

lapping said head while monitoring changes in said electrical resistance.

12. A method in accordance with claim 11 wherein said resistive element is disposed between said sensor element and a lapping tool and wherein:

a lapping rate is calculated while lapping said resistive element; and said lapping rate is used to lap said sensor element.

13. A method in accordance with claim 12 wherein there are two resistive elements providing a coarse lapping guide and a fine lapping guide, and wherein said lapping rate is determined from lapping said fine lapping guide.

14. A method in accordance with claim 13 wherein said coarse lapping guide has a greater width and height than said fine lapping guide.

15. A method in accordance with claim 13 wherein said coarse lapping guide is separated from said fine lapping guide by a gap and wherein said method includes a lapping clean up phase to remove smeared material after lapping said coarse lapping guide and before lapping said fine lapping guide.

16. A method in accordance with claim 13 wherein said fine lapping guide has a height corresponding to a height of said sensor element.

17. A method in accordance with claim 13 wherein said fine lapping guide has a width corresponding to a track width of said sensor element.

18. A method in accordance with claim 17 wherein said sensor electrical leads are shaped to define said width of said fine lapping guide and said track width of said sensor element, and to further define a width of said coarse lapping guide that is larger than said fine lapping guide width and said sensor element track width.

19. A method in accordance with claim 11 wherein said resistive element and said sensor element comprise identical thin film layers.

20. A method in accordance with claim 13 wherein said fine lapping guide, said coarse lapping guide and said sensor element comprise identical thin film layers.

21. A method of forming a magnetoresistive sensor with an onboard electronic lapping guide, comprising;

forming a plurality of sensor layers on a substrate;

photolithographically etching said sensor layers using a track width defining mask to create a pair of etched pockets;

forming a pair of sensor electrical leads in said etched pockets, said electrical leads being spaced from each other to define a sensor track width;

photolithographically etching said sensor layers to define a sensor element using a stripe height defining mask to remove sensor material outside said mask;

said stripe height defining mask further defining a lapping guide resistive element extending between said electrical leads and spaced from said sensor element in a lapping direction;

said resistive element having a predetermined height in a lapping direction; and said resistive element being adapted to produce an electrical resistance in the presence of a lapping current that increases as said resistive element height is reduced during lapping.

22. A method in accordance with claim 21 wherein said resistive element is disposed between said sensor element and a portion of said sensor that will receive a lapping tool.

23. A method in accordance with claim 21 wherein there are two resistive elements providing a coarse lapping guide and a fine lapping guide.

24. A method in accordance with claim 23 wherein said coarse lapping guide has a greaser width and height than said fine lapping guide.

25. A method in accordance with claim 23 wherein said coarse lapping guide is separated from said fine lapping guide by a gap that is of sufficient height to support a lapping clean-up phase.

26. A method in accordance with claim 23 wherein said fine lapping guide has a height corresponding to a height of said sensor element.

27. A method accordance with claim 23 wherein said fine lapping guide has a width corresponding to a track width of said sensor element.

28. A method in accordance with claim 27 wherein said sensor electrical leads are shaped to define said width of said fine lapping guide and said track width of said sensor element, and to further define a width of said coarse lapping guide that is larger than said fine lapping guide width and said sensor element track width.

29. A method in accordance with claim 21 wherein said resistive element and said sensor element comprise identical thin film layers.

30. A method in accordance with claim 23 wherein said fine lapping guide, said coarse lapping guide and said sensor element comprise identical thin film layers.

* * * * *